United States Patent
Soares

(10) Patent No.: US 6,808,370 B1
(45) Date of Patent: Oct. 26, 2004

(54) GAS PRESSURE DRIVEN TANK FLUID PUMP HAVING FLOAT AND SNAP-ACTING ROTARY VALVE

(75) Inventor: Jairo Luiz Soares, Columbia, SC (US)

(73) Assignee: Spirax Sarco, Inc., Blythewood, SC (US)

( * ) Notice: Subject to any disclaimer, the term of this patent is extended or adjusted under 35 U.S.C. 154(b) by 0 days.

(21) Appl. No.: 10/214,513

(22) Filed: Aug. 8, 2002

(51) Int. Cl.$^7$ .............................. F04F 1/06; F16K 21/18
(52) U.S. Cl. ...................... 417/131; 417/126; 137/398; 137/420
(58) Field of Search ................................. 417/126, 131, 417/132, 133, 130, 134, 135; 137/199, 398, 209, 418, 420, 196, 447, 560, 565.01, 565.11, 565.12, 565.13, 565.35; 261/19, 73; 251/75; 4/300, 325

(56) References Cited

U.S. PATENT DOCUMENTS

| | | | |
|---|---|---|---|
| 1,635,692 A | | 7/1927 | Schweisthal |
| 1,727,082 A | * | 9/1929 | Rayfield ..................... 137/447 |
| 1,767,477 A | * | 6/1930 | Rogers et al. ............... 417/131 |
| 1,893,066 A | | 1/1933 | Zellhoefer |
| 1,927,636 A | * | 9/1933 | Gary .......................... 208/178 |
| 1,931,275 A | * | 10/1933 | Trumble et al. ............. 137/194 |
| 2,383,834 A | * | 8/1945 | Yeomans ..................... 417/131 |
| 2,394,169 A | | 2/1946 | Gray et al. |
| 5,141,405 A | | 8/1992 | Francart, Jr. |
| 5,445,501 A | | 8/1995 | Yumoto |
| 5,465,755 A | * | 11/1995 | Lapp ..................... 137/625.21 |
| 5,655,888 A | | 8/1997 | Yumoto |
| 5,755,560 A | | 5/1998 | Yumoto |
| 5,865,603 A | | 2/1999 | Francart, Jr. |
| 5,934,881 A | | 8/1999 | Yumoto |
| 5,938,409 A | | 8/1999 | Radle, Jr. et al. |
| 5,944,490 A | | 8/1999 | Breslin |
| 6,244,828 B1 | | 6/2001 | Yumoto |
| 6,244,829 B1 | | 6/2001 | Yumoto |

* cited by examiner

Primary Examiner—Charles G. Freay
(74) Attorney, Agent, or Firm—Nelson Mullins Riley & Scarborough

(57) ABSTRACT

A gas pressure driven fluid pump comprising a pump tank having a liquid inlet and a liquid outlet. A float, carried within the interior of the pump tank, is operable to move between a low level position and a high level position. A snap-acting valve is operatively connected to the float. The snap acting valve has a rotatable port member that moves so as to switch to exhaust porting when the float falls to the low level position. The port member further switches to motive porting when the float rises to the high level position. As a result, fluid filling the pump tank causes the float to rise from the low level position to the high level position during exhaust porting. Fluid exiting the pump tank causes the float to fall from the high level position to the low level position due to introduction of motive gas during motive porting.

37 Claims, 7 Drawing Sheets

GAS PRESSURE DRIVEN TANK FLUID PUMP HAVING FLOAT AND SNAP-ACTING ROTARY VALVE

BACKGROUND OF THE INVENTION

The present invention relates generally to the art of gas pressure driven fluid pumps. More particularly, the invention relates to such a pump utilizing a snap-acting rotary valve to control gas ports.

Condensate removal systems in steam piping arrangements often utilize gas pressure driven pumps that function without electrical power. As described in U.S. Pat. No. 5,938,409 to Radle (incorporated herein by reference), such a pump will typically have a tank with a liquid inlet and liquid outlet. The liquid inlet and liquid outlet, which are located near the bottom of the tank, will be equipped with an inlet check valve and an outlet check valve to permit liquid flow only in the pumping direction. A pair of valves interconnected by a snap-acting linkage control a gas motive port and a gas exhaust port.

The pump operates by alternating between a liquid filling phase and a liquid discharge phase. During the liquid filling phase, the motive port is closed while the exhaust port is open. A float connected to the snap acting linkage rises with the level of liquid entering the tank. When the float reaches an upper crossover point, the linkage snaps over to simultaneously open the motive port and close the exhaust port. As a result, the pump will switch to the liquid discharge phase.

In the liquid discharge phase, steam or other motive gas is introduced into the pump tank through the motive port. The motive gas forces liquid from the tank, thus causing the float to lower with the level of the liquid. When the float reaches a lower crossover point, the linkage snaps over to simultaneously open the exhaust port and closes the motive port. As result, the pump will again be in the liquid filling phase.

While the snap-acting linkage used in gas pressure driven pumps of the prior art has generally functioned well, there exists room in the art for additional snap-acting valve arrangements.

SUMMARY OF THE INVENTION

The present invention recognizes and addresses the foregoing considerations, and others, of prior art constructions and methods.

In one aspect, the invention provides a gas pressure driven fluid pump comprising a pump tank having a liquid inlet and a liquid outlet. A float, carried within the interior of the pump tank, is operable to move between a low level position and a high level position. A snap-acting valve is operatively connected to the float.

The snap-acting valve has a rotatable port member that moves so as to switch to exhaust porting when the float falls to the low level position. The port member further switches to motive porting when the float rises to the high level position. As a result, fluid filling the pump tank causes the float to rise from the low level position to the high level position during exhaust porting. Fluid exiting the pump tank causes the float to fall from the high level position to the low level position due to introduction of motive gas during motive porting.

In some exemplary embodiments, the valve comprises an actuator member connected to the float so as to directly rotate as the float moves between the low level and high level positions. Also provided is a mechanism operatively interconnecting the actuator member and the port member such that rotation of the actuator member will cause selective rotation of the port member. Often, the mechanism interconnecting the actuator member and the port member may comprise at least one spring extending between the actuator member and the port member. For example, the mechanism may comprise a plurality of spaced apart springs extending between the actuator member and the port member.

Preferably, the actuator member and the port member of the valve may rotate about a common axis. For example, the float may be connected to the actuator member by an axial shaft rotating about the common axis so as to cause rotation of the actuator member.

Exemplary embodiments are contemplated in which the port member defines first and second fluid passages which are moved into and out of registry with respective motive and exhaust ports when the port member rotates. In such embodiments, the motive and exhaust ports may be defined in a fixed surface. The port member and the fixed surface are preferably juxtaposed in face-to-face contact.

Other aspects of the present invention are achieved by a snap-acting valve comprising an actuator member movable between a first position and a second position. A port member defining a first flow passage is also provided. The port member is configured to move between an open position that allows flow through the first flow passage and a closed position that prevents flow through the first flow passage. Also provided is a mechanism interconnecting the actuator member and the port member such that the port member snaps over to the open position when the actuator member travels to and reaches the first position. Similarly, the port member snaps over to the closed position when the actuator member travels to and reaches the second position.

In some exemplary embodiments, the actuator member and the port member will rotate about a common axis. For example, the actuator member may be generally cup-shaped, with the port member being concentrically positioned in the actuator member. Moreover, a bearing element may interpose the actuator member and the port member to facilitate relative rotation therebetween.

Often, the port member may be configured as a disc-like plate. In such embodiments, the port member may be juxtaposed in face-to-face contact with a surface defining a first flow port. Moreover, embodiments are contemplated in which the first flow passage is formed by a groove defined in a surface of the port member. Alternatively, the first flow passage may be formed as a hole defined in and extending through the port member.

Still further aspects of the present invention are achieved by a valve comprising a surface defining a first flow port. An actuator member rotatable about an axis of rotation is also provided. The valve further comprises a port member defining a first flow passage. The port member is rotatable about the axis of rotation to move the first flow passage in and out of registry with the first flow port. Also provided is a mechanism interconnecting the actuator member and the port member such that rotation of the actuator member will cause selective rotation of the port member.

In some exemplary embodiments, the port member further defines a second flow passage and the surface further defines a second flow port. Embodiments are contemplated in which the second flow passage will be in registry with the second flow port when the flow passage is out of registry with the first flow port.

Additional aspects of the invention are achieved by a method of switching between a first port and a second port. One step of the method involves rotating an actuator member from a first position to a second position. In response to the actuator member traveling to and reaching the second position, a port member is rotated in a snap over manner to a position that blocks flow into the first port while allowing flow into the second port. In response to the actuator member traveling to and reaching the first position, the port member is rotated in a snap over manner to a position that blocks flow into the second port while allowing flow into said first port.

The accompanying drawings, which are incorporated in and constitute a part of this specification, illustrate one or more embodiments of the invention and, together with the description, serve to explain the principles of the invention.

BRIEF DESCRIPTION OF THE DRAWING

A full and enabling disclosure of the present invention, including the best mode thereof to one of ordinary skill in the art, is set forth more particularly in the remainder of the specification, which makes reference to the accompanying drawings, in which.

Figure 1A:
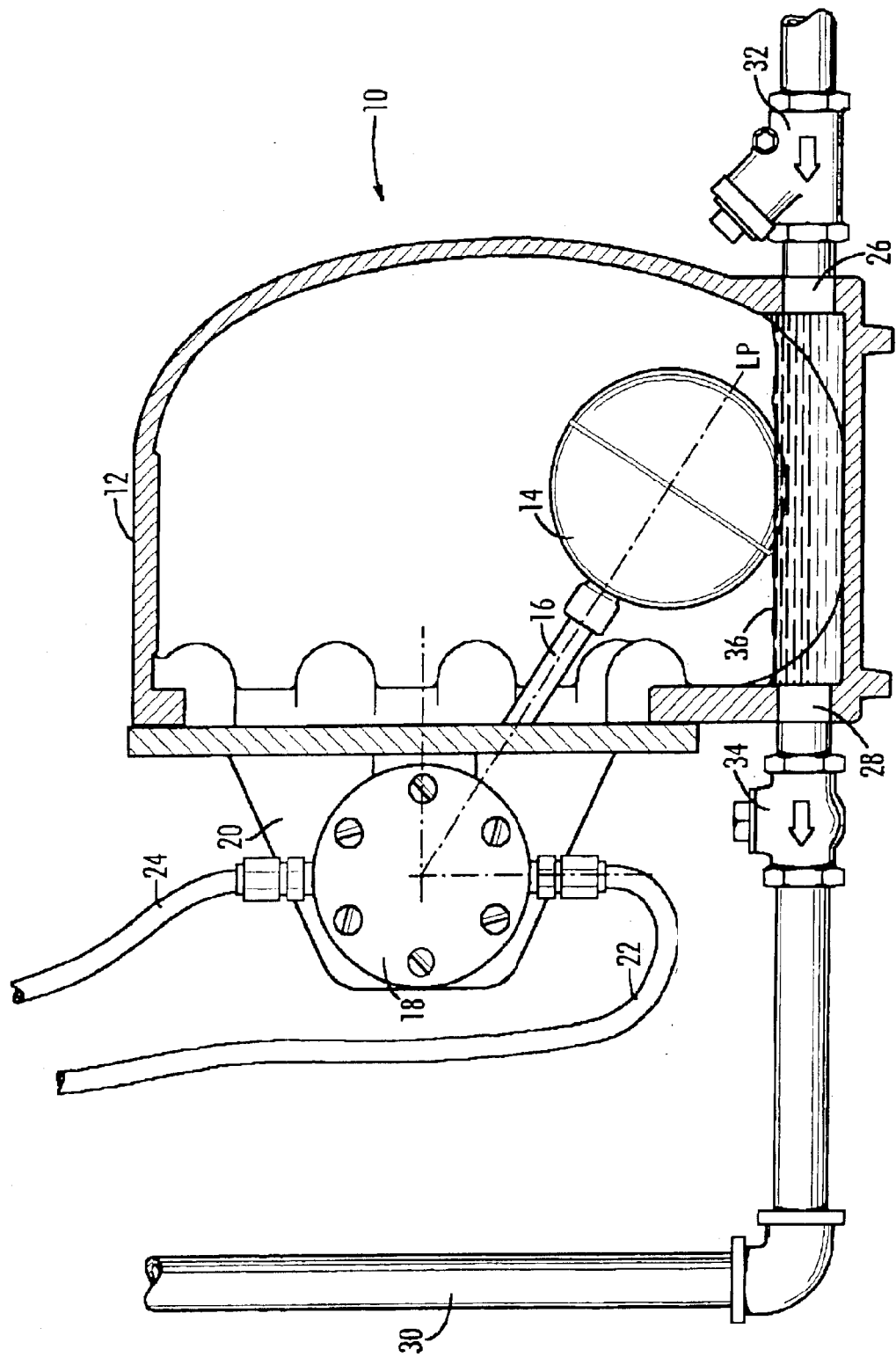
FIG. 1A is a side cross-sectional view of a pressure driven pump constructed in accordance with the present invention with the float in the low level position.

Repeat use of reference characters in the present specification and drawings is intended to represent same or analogous features or elements of the invention.

DETAILED DESCRIPTION OF THE PREFERRED EMBODIMENTS

Reference will now be made in detail to presently preferred embodiments of the invention, one or more examples of which are illustrated in the accompanying drawings. Each example is provided by way of explanation of the invention, not limitation of the invention.

Figure 1B:
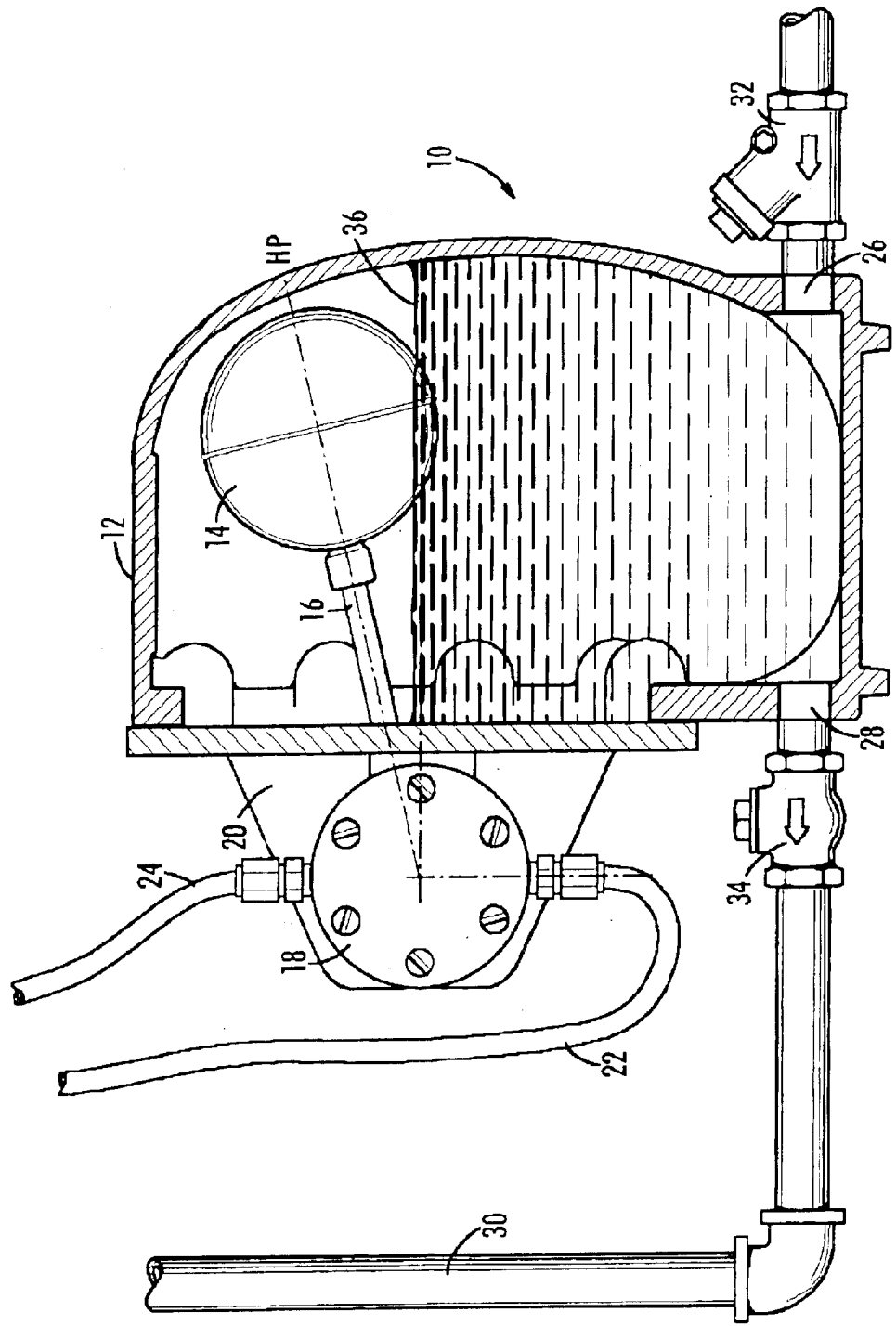
FIG. 1B is a view similar to FIG. 1A with the float in the high level position.

FIGS. 1A and 1B illustrate a pressure driven pump 10 constructed in accordance with the present invention. As shown, pump 10 has a tank 12 defining an interior in which a float 14 is located. Float 14 is attached to the end of a float arm 16 which is operatively connected to a snap-acting rotary valve 18. In this case, tank 12 includes an extension portion 20 to which valve 18 is attached. Because valve 18 is positioned outside of tank 12, maintenance needed for valve 18 can be advantageously performed without opening tank 12.

Valve 18 controls introduction of gas into and exhaust of gas out of the interior of tank 12 based on the position of float 14. Toward this end, motive pipe 22 is connected between valve 18 and a source of motive gas, such as a source of steam. Similarly, balance pipe 24 is connected between valve 18 and a suitable sink to which gas inside of tank 12 can be exhausted. In some cases, for example, pipe 24 can terminate such that the gas will simply exhaust to the ambient atmosphere.

As shown, tank 12 defines a liquid inlet 26 through which the liquid to be pumped is introduced. Tank 12 further defines a liquid outlet 28 through the liquid passes when pumped into return line 30. Respective check valves 32 and 34 are provided at liquid inlet 26 and liquid outlet 28 so that the liquid flows in only the desired direction.

When tank 12 is emptied, float 14 will fall to the low level position LP shown in FIG. 1A. Upon reaching position LP, valve 18 will be switched in a snap over manner from motive porting to exhaust porting. During exhaust porting, valve 18 will allow fluid communication between the interior of tank 12 and pipe 24. When the pressure of the input liquid is sufficient to overcome the pressure drop across check valve 32, it will begin flowing into tank 12. If the pressure of the liquid is sufficient, it will continue through check valve 34 and into return line 30. When the back pressure in return line 30 exceeds the pressure in the interior of tank 12, however, the liquid will begin to fill tank 12. As the level 36 of the liquid rises, so does float 14.

When float 14 reaches its high level position HP (FIG. 1B), valve 18 will be switched in a snap over manner from exhaust porting to motive porting. During motive porting, valve 18 will allow fluid communication between pipe 22 and the interior of tank 12. Motive gas thus introduced into tank 12 will force the liquid through liquid outlet 28 and into return line 30. Float 14 drops along with the level 36 of the liquid, eventually falling to the low level position LP. At this point, the pumping cycle will begin again.

Figure 2A:
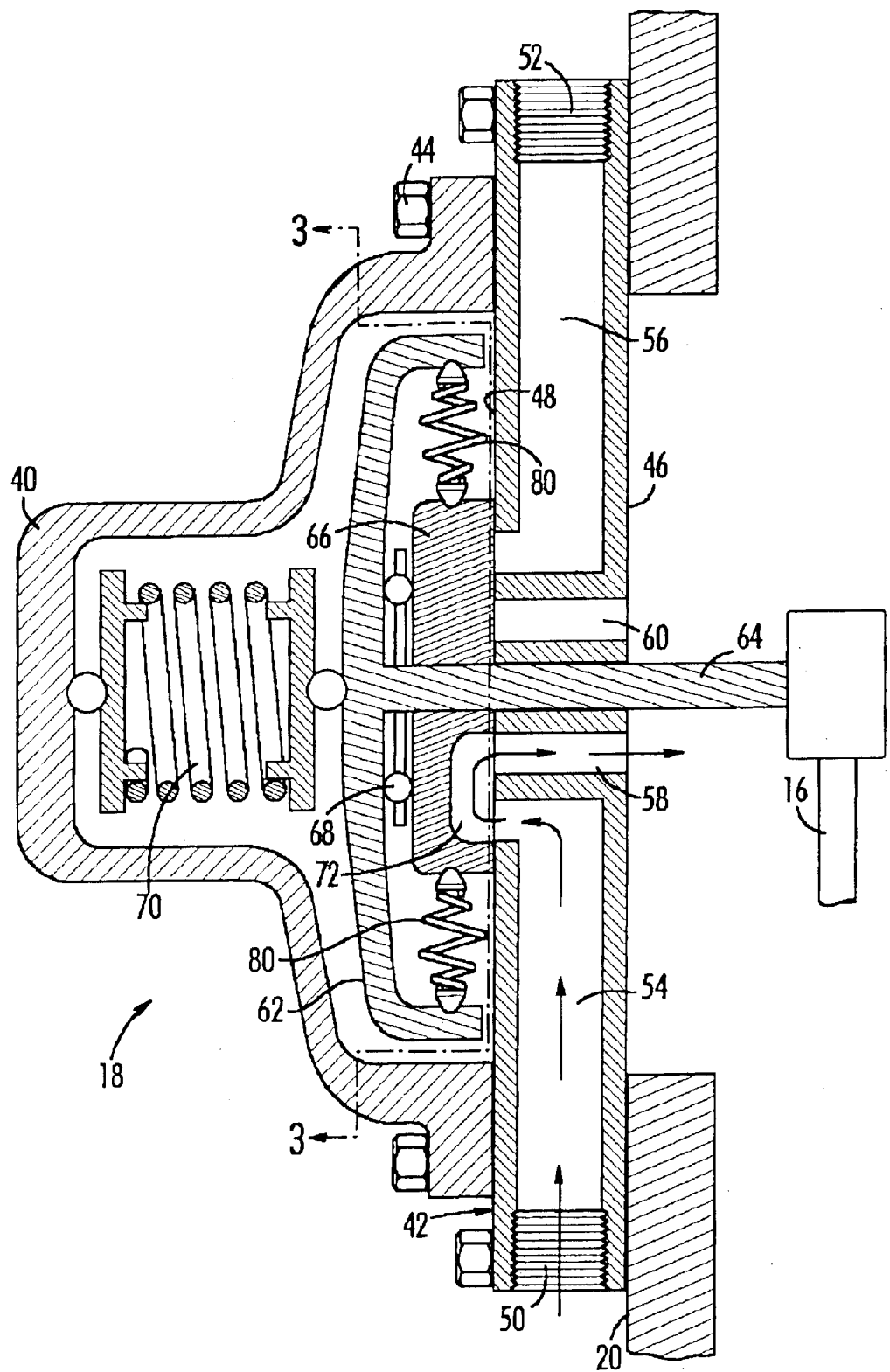
FIG. 2A is a side cross-sectional view of the snap-acting rotary valve of the pump of FIGS. 1A and 1B wherein the motive port is open and the exhaust port is closed.
Figure 2B:
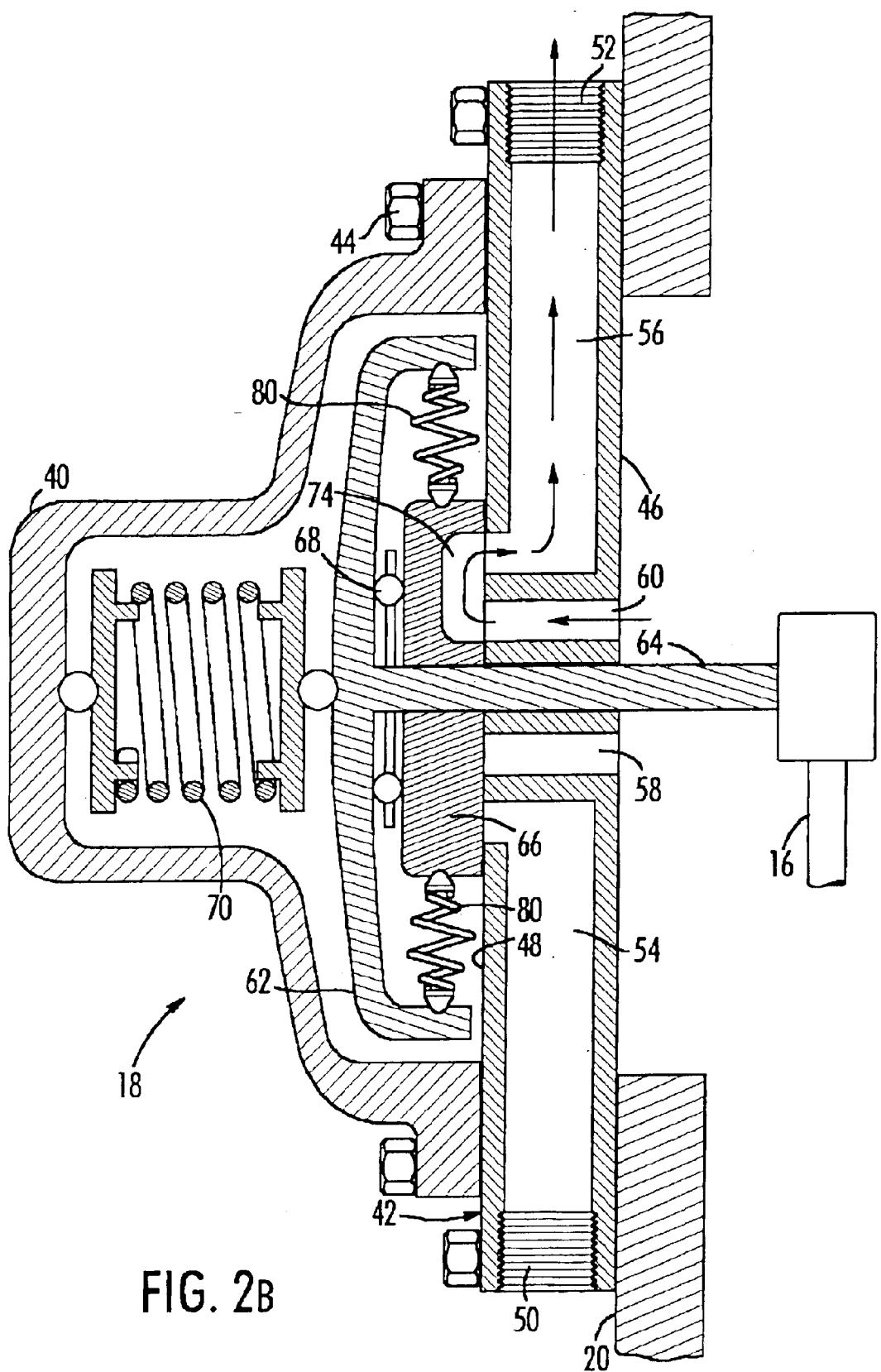
FIG. 2B is a view similar to FIG. 2A but with the motive port closed and the exhaust port open.

The construction of valve 18 will now be described with reference to FIGS. 2A and 2B. Valve 18 includes a housing 40 that is attached to a fixed plate 42. Fixed plate 42 is itself attached directly to extension portion 20 of tank 12. Preferably, housing 40 and plate 42 may be attached using bolts (such as bolt 44) to facilitate removal for maintenance purposes. As one skilled in the art will appreciate, gaskets or like may be provided between the mating surfaces.

Fixed plate 42, which is preferably formed of metal (such as hardenable stainless steel), has a first surface 46 and an opposite second surface 48. In the illustrated embodiment, first surface 46 faces the interior of tank 12. A pair of threaded connections 50 and 52 are provided for attachment of pipes 22 and 24, respectively. Threaded connections 50 and 52 each have an associated flow path 54 and 56 which terminate with an opening on second surface 48. In addition, fixed plate 42 defines a motive port 58 and an exhaust port 60 extending therethrough.

Valve 18 includes an actuator member 62 fixed to an axial shaft 64. As one skilled in the art will appreciate, actuator member 62 and axial shaft 64 can be constructed as a unitary member or can be two pieces directly connected or as a slotted connection. As shown, float arm 16 is attached to axial shaft 64 such that movement of float 14 causes actuator member 62 to rotate through a range of limited angular extent. While shown as a direct connection in this case, one skilled in the art will appreciate that float arm 16 could be connected to axial shaft 64 as a slotted connection depending on the required angle of rotation of the float arm relative to actuator member 62.

A rotatable port member 66 is operatively interconnected to actuator member 62 to switch between exhaust porting and motive porting when the float reaches the low level and high level positions. In this case, actuator member 62 has a generally cup-shaped configuration in which port member 66 is concentrically received. Port member 66 may itself be formed as a disc-like plate defining a centerline bore through which axial shaft 64 extends. Port member 66 will thus rotate about a common axis with actuator member 62. Preferably, actuator member 62 and port member 66 may be formed of suitable metal, such as hardenable stainless steel.

A bearing assembly, here in the form of thrust bearing assembly 68, facilitates relative rotation between actuator member 62 and port member 66 while maintaining a predetermined separation therebetween. An axial compression spring 70 pushes against actuator member 62 so as to urge port member 66 into engagement with fixed plate 42. Fixed plate 42 and port member 66 will thus be in face-to-face contact, which will generally be sufficient to eliminate the need for elastomeric seals and the like at this location. A bearing may also be provided at opposing ends of compression spring 70.

A pair of fluid passages 72 (FIG. 2A) and 74 (FIG. 2B) are formed in this exemplary embodiment by respective grooves defined in port member 66. The valving operation is effected by moving fluid passages 72 and 74 into and out of registry with ports 58 and 60. During motive porting (as shown in FIG. 2A), fluid passage 72 provides fluid communication between flow path 54 and motive port 58. During exhaust porting (as shown in FIG. 2B), fluid passage 74 provides fluid communication between flow path 56 and exhaust port 60.

Actuator member 62 and port member 66 are operatively interconnected by a suitable mechanism which causes port member 66 to shift between exhaust porting and motive porting in a snap over manner. In other words, port member 66 will not modulate as actuator member 62 moves, but will only change states when float 14 reaches the desired position. In the illustrated embodiment, this is achieved utilizing a plurality of tripping springs.

Figure 3A:
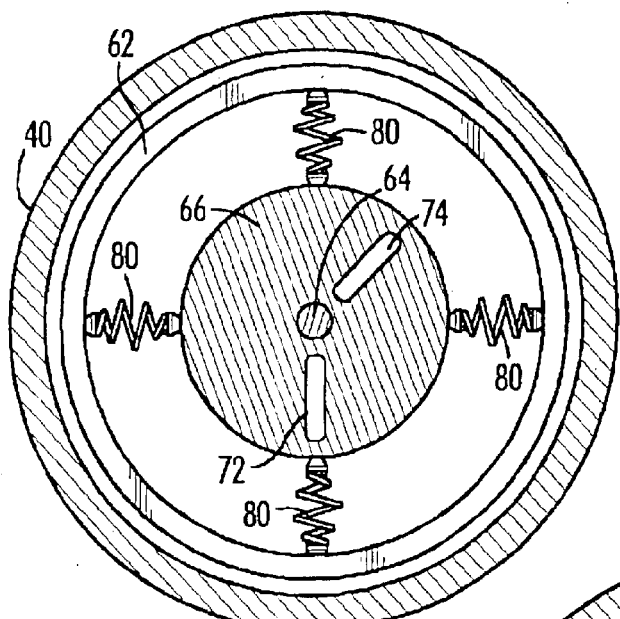
FIGS. 3A–3C are views taken along line 3—3 of FIG. 2A showing various rotational positions of the actuator member and port member.
Figure 3B:
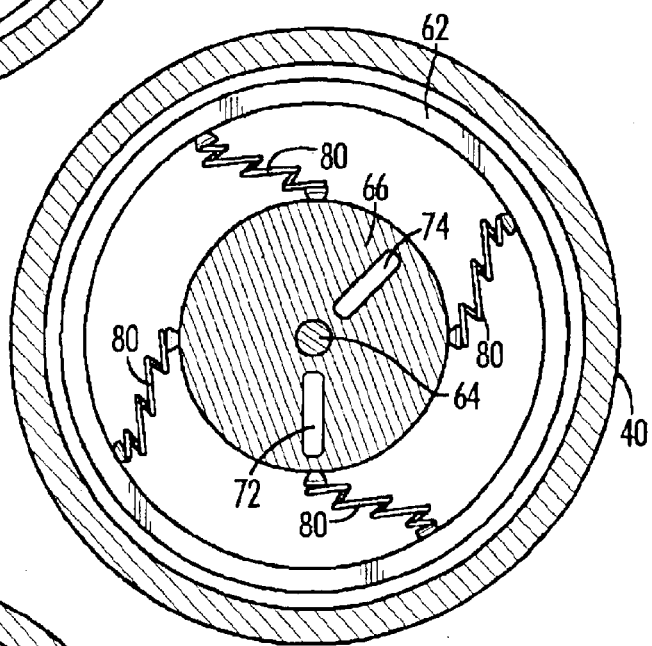
Figure 3C:
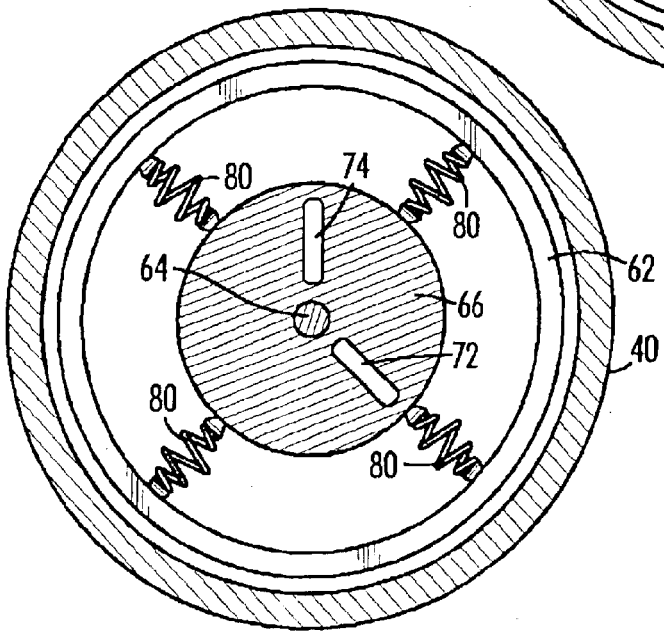

As can be seen most clearly in FIGS. 3A-3C, the tripping springs may preferably be a plurality of springs 80 equally spaced about the rotational axis of actuator member 62. Preferably, springs 80 are compressed between actuator member 62 and port member 66 and pinned at each end. Springs 80 provide a dynamic link between actuator member 62 and port member 66 and provide the desired "snap over" action.

The manner in which tripping springs 80 operate can be most easily explained with reference to FIGS. 3A-3C. Referring first to FIG. 3A, port member 66 is in the motive porting position illustrated in FIG. 2A. As can be seen, fluid passage 72 is situated to provide fluid communication between flow path 54 and motive port 58. In contrast, fluid passage 74 is positioned so as to close exhaust port 60.

In FIG. 3B, actuator member 62 has rotated due to movement of float 14. While port member 66 remains in its previous position, an increasing shear force is applied on springs 80. When float 14 reaches low level position LP, the force is sufficient to cause springs 80 to trip over center.

As shown in FIG. 3C, port member 66 will then be positioned for exhaust porting. In this position, passage 74 is situated to provide fluid communication between flow path 56 and exhaust port 60. In contrast, fluid passage 72 will be positioned so as to close motive port 58. Travel stops are preferably provided so as to limit angular movement of port member 66 in both rotational directions.

As one skilled in the art will appreciate, the design of valve 18 makes it more versatile than many prior art designs in its range of operating pressures and capacities. In addition, little or no changes will often be required to the valve in order to accommodate different operating pressures and capacities. Many prior art designs, in contrast, require substantial modifications as operating pressures and capacities are changed.

Figure 4:
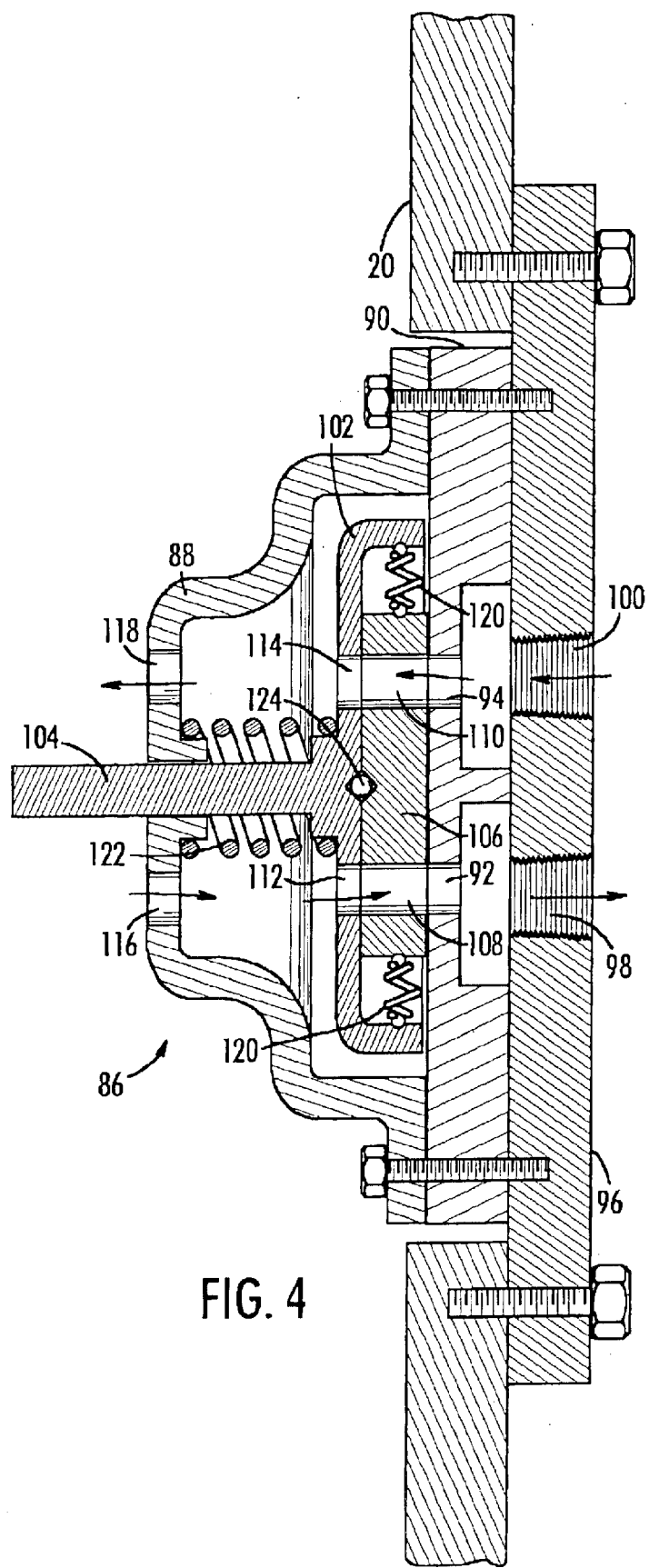
FIG. 4 is a side cross-sectional view of another embodiment of a snap-acting rotary valve constructed in accordance with the present invention.

FIG. 4 illustrates a second embodiment of a snap-acting rotary valve in accordance with the present invention which has a flow path parallel to the axis of rotation. Valve 86 includes a housing 88 attached to a fixed plate 90 defining respective motive and exhaust ports 92 and 94. Fixed plate 90 is in turn attached to a pipe connection plate 96. Pipe connection plate 96 defines threaded connections 98 and 100 for attachment of pipes 22 and 24, respectively.

Valve 86 further includes an actuator member 102 having an axial shaft 104. A port member 106 is concentrically received in actuator member 102 to as to rotate about a common axis. In this embodiment, shaft 104 extends axially away from port member 106 through a hole defined in housing 88. As a result, the entire valve assembly can be conveniently located on the tank interior side of fixed plate 90 and pipe connection plate 96.

In this embodiment, fluid passages 108 and 110 are formed as respective holes passing completely through port member 106. Fluid passages 108 and 110 are positioned to move into and out of registry with ports 92 and 94 when port member 106 rotates. (For purposes of explanation, fluid passages 108 and 110 are shown in alignment at the same time with their corresponding ports. Typically, however, one port will be closed while the other is open as described in relation to the preceding embodiment.) In this case, actuator member 102 contains flow holes 112 and 114 in operative alignment with respective fluid passages 108 and 110. One or more flow holes, such as flow holes 116 and 118, may also be defined in housing 88.

Like the preceding embodiment, actuator member 102 is connected to port member 106 via tripping springs 120 to provide a nonmodulating snap action between porting changes. An axial compression spring 122 provides a force normal to the face of port member 106 to provide a pressure seal between port member 106 and fixed plate 90. Bearing element 124 facilitates relative rotation of actuator member 102 and port member 106 and maintains centering.

Figure 5:
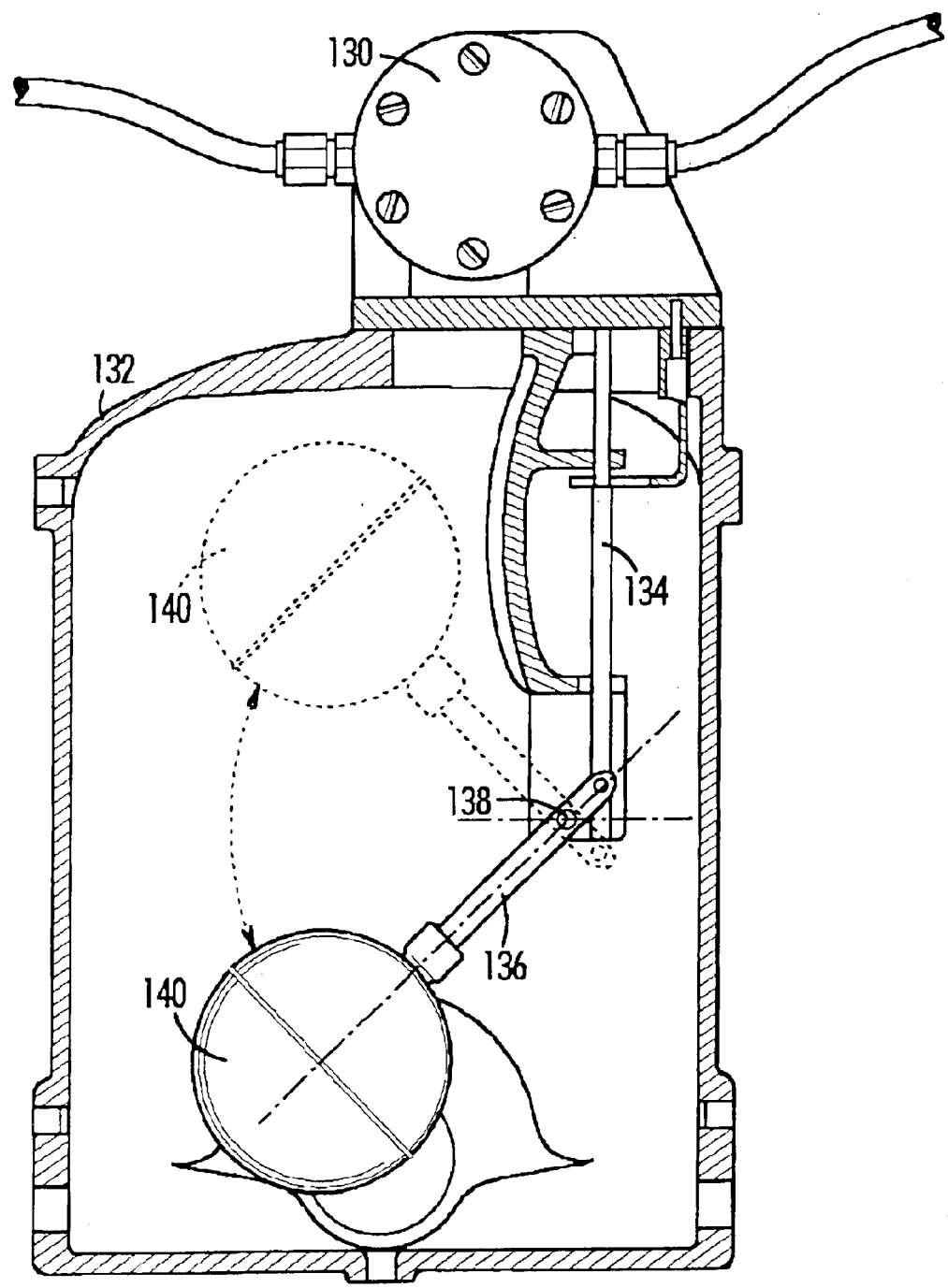
FIG. 5 is a side cross-sectional view of another embodiment of a pressure driven pump constructed in accordance with the present invention in which the rotary valve is located on top of the pump tank.

FIG. 5 illustrates a second embodiment in which a snap acting rotary valve 130 of the present invention is mounted to the top of a pump tank 132. In this case, a perpendicular extender arm (not shown) is attached to the end of the valve's axial shaft in a manner similar to float arm 16 in the embodiment of FIGS. 2A and 2B. In this case, however, this extender arm is itself connected to the end of an intermediate linkage rod 134. Rod 134 is, in turn, attached to the end of float arm 136. As shown, the pump includes a float 140 which pivots about pivot point 138. As a result, movement of float 140 between its high and low positions will cause rotation of the valve's axial shaft.

It can thus be seen that the present invention provides a gas pressure driven fluid pump having a novel snap-acting rotary valve. The rotary valve advantageously reduces the number of component parts required by many prior art designs and combines them in a compact assembly. Maintenance requirements should also be reduced due to the fewer number of components parts. In addition, the valve assembly may be constructed as a unit that can be easily detached from the pump tank for repair or replacement.

While preferred embodiments of the invention have been shown and described, modifications and variations may be made thereto by those of ordinary skill in the art without departing from the spirit and scope of the present invention. For example, other mechanisms may be used to interconnect the actuator member and the port member to achieve the desired snap action. For example, embodiments are contemplated in which repelling magnets provide the dynamic link between these two parts.

In addition, embodiments are contemplated having more or less ports than the embodiments shown in the drawings. For example, the rotary valve could be segregated into three or more flow ports with the port member snapping from one position to the next.

One skilled in the art will also appreciate that the rotary valve of the present invention could be utilized in various applications other than a gas pressure driven pump as described above. In such applications, the valve could be operated by various devices and mechanisms (e.g., by hand, float, electric, pneumatic, etc.).

It should also be understood that aspects of the various embodiments may be interchanged both in whole or in part. Furthermore, those of ordinary skill in the art will appreciate that the foregoing description is by way of example only, and is not intended to be limitative of the invention as further described in the appended claims.

What is claimed is:

1. A gas pressure driven fluid pump, said pump comprising:
   a pump tank having a liquid inlet and a liquid outlet;
   a float carried within the interior of said pump tank, said float being operable to move between a low level position and a high level position;
   a snap-acting valve operatively connected to said float, said valve having a rotatable port member that moves so as to switch to exhaust porting when said float reaches said low level position and to switch to motive porting when said float reaches said high level position; and
   whereby fluid filling said pump tank causes said float to rise from said low level position to said high level position during said exhaust porting and fluid exiting said pump tank causes said float to fall from said high level position to said low level position due to introduction of motive gas during said motive porting.

2. A pump as set forth in claim 1, wherein said valve comprises:
   an actuator member connected to said float so as to directly rotate as said float moves between said low level position and said high level position; and
   a mechanism operatively interconnecting said actuator member and said port member such that said rotation of said actuator member will cause selective rotation of said port member.

3. A pump as recited in claim 2, wherein said mechanism interconnecting said actuator member and said port member comprises at least one spring extending between said actuator member and said port member.

4. A pump as recited in claim 3, wherein said mechanism interconnecting said actuator member and said port member comprises a plurality of spaced apart springs extending between said actuator member and said port member.

5. A pump as recited in claim 2, wherein said actuator member and said port member rotate about a common axis.

6. A pump as recited in claim 5, wherein said float is connected to said actuator member by an axial shaft, said shaft rotating about said common axis so as to cause rotation of said actuator member.

7. A pump as recited in claim 1, wherein said port member defines first and second fluid passages, said first and second fluid passages being moved into and out of registry with respective motive and exhaust ports when said port member rotates.

8. A pump as recited in claim 7, wherein said motive and exhaust ports are defined in a fixed element, said port member and said surface being juxtaposed in face-to-face contact.

9. A snap-acting valve comprising:
   an actuator member movable between a first position and a second position;
   a port member defining a first flow passage, said port member being configured to move between an open position that allows flow through said first flow passage and a closed position that prevents flow through said first flow passage; and
   a mechanism operatively interconnecting said actuator member and said port member such that said port member snaps over to said open position when said actuator member reaches said first position and said port member snaps over to said closed position when said actuator member reaches said second position.

10. A valve as recited in claim 9, wherein said mechanism interconnecting said actuator member and said port member comprises at least one spring extending between said actuator member and said port member.

11. A valve as recited in claim 10, wherein said mechanism interconnecting said actuator member and said port member comprises a plurality of spaced apart springs extending between said actuator member and said port member.

12. A valve as recited in claim 11, wherein said actuator member and said port member rotate about a common axis.

13. A valve as recited in claim 12, wherein said actuator member is generally cup-shaped, said port member being concentrically positioned in said actuator member.

14. A valve as recited in claim 13, further comprising a bearing element interposing said actuator member and said port member to facilitate relative rotation therebetween.

15. A valve as recited in claim 9, wherein said port member further defines a second flow passage positioned such that flow therethrough is prevented when said port member is in said open position.

16. A valve as recited in claim 15, wherein flow is allowed through said second flow passage when said port member is in said closed position.

17. A valve as recited in claim 9, wherein said port member is configured as a disc-like plate.

18. A valve as recited in claim 17, wherein said port member is juxtaposed in face-to-face contact with a element defining a first flow port.

19. A valve as recited in claim 18, wherein said first flow passage is formed by a groove defined in a surface of said port member.

20. A valve as recited in claim 18, wherein said first flow passage is formed as a hole defined in and extending through said port member.

21. A valve as recited in claim 9, wherein said actuator member rotates between said first position and said second position.

22. A valve as recited in claim 9, wherein said port member rotates between said open position and said closed position.

23. A valve comprising:

an element defining a first flow port;

an actuator member rotatable about an axis of rotation;

a port member defining a first flow passage, said port member rotatable about said axis of rotation to move said first flow passage in and out of registry with said first flow port; and a mechanism interconnecting said actuator member and said port member such that said port member snaps to a position in registry with said first flow port when said actuator member reaches a first position and said port member snaps to a position out of registry with said first flow port when said actuator member reaches a second position.

24. A valve as set forth in claim 23, further comprising an axial shaft connected to said actuator member, said shaft rotating about said axis of rotation so as to cause rotation of said actuator member.

25. A valve as set forth in claim 24, wherein said axial shaft is connected to a float such that said actuator member will be rotated by rising and falling of said float.

26. A valve as set forth in claim 24, wherein said axial shaft extends through a centerline bore defined in said port member.

27. A valve as set forth in claim 24, wherein said axial shaft extends axially away from said port member.

28. A valve as recited in claim 23, wherein said port member and said element are each constructed of metal, said port member juxtaposed in face-to-face contact with said element.

29. A valve as recited in claim 23, further comprising an axial compression spring urging said port member into face-to-face contact against said element.

30. A valve as recited in claim 23, further comprising a bearing element interposing said actuator member and said port member to facilitate relative rotation therebetween.

31. A valve as recited in claim 30, wherein said port member further defines a second flow passage.

32. A valve as recited in claim 31, wherein said element further defines a second flow port.

33. A valve as recited in claim 32, wherein said second flow passage will be in registry with said second flow port when said first flow passage is out of registry with said first flow port.

34. A valve as recited in claim 23, wherein said actuator member travels between a first predetermined location and a second predetermined location and said mechanism interconnecting said actuator member and said port member functions to cause said port member to snap over when said actuator member reaches said first predetermined location and said second predetermined location.

35. A valve as recited in claim 34, wherein said mechanism interconnecting said actuator member and said port member comprises at least one spring extending between said actuator member and said port member.

36. A valve as recited in claim 35, wherein said mechanism interconnecting said actuator member and said port member comprises a plurality of spaced apart springs extending between said actuator member and said port member.

37. A method of switching between a first port and a second port comprising the steps of:

(a) rotating an actuator member from a first position to a second position;

(b) in response to said actuator member reaching said second position, rotating a port member in a snap over manner to a position that blocks fluid flow into said first port while allowing fluid flow into said second port; and (c) in response to said actuator member reaching said first position, rotating said port member in a snap over manner to a position that blocks fluid flow into said second port while allowing fluid flow into said first port.

* * * * *